US010336449B2

(12) United States Patent
Alber

(10) Patent No.: US 10,336,449 B2
(45) Date of Patent: Jul. 2, 2019

(54) ENGINE INSTALLATION OF VERTICAL TAKE-OFF AND LANDING (VTOL) AIRCRAFT

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 354 days.

(21) Appl. No.: 15/132,883

(22) Filed: Apr. 19, 2016

(65) Prior Publication Data

US 2016/0304196 A1   Oct. 20, 2016

Related U.S. Application Data

(60) Provisional application No. 62/149,948, filed on Apr. 20, 2015.

(51) Int. Cl.
*B64C 29/02* (2006.01)
*B64D 33/02* (2006.01)
*B64D 33/04* (2006.01)
*B64D 27/12* (2006.01)

(52) U.S. Cl.
CPC ............ *B64C 29/02* (2013.01); *B64D 27/12* (2013.01); *B64D 33/02* (2013.01); *B64D 33/04* (2013.01); *B64D 2033/045* (2013.01)

(58) Field of Classification Search
CPC ........ B64D 33/02; B64D 33/04; B64D 27/12; B64C 29/02
See application file for complete search history.

(56) References Cited

U.S. PATENT DOCUMENTS

| 2,704,434 | A | * | 3/1950 | Schmitt |
| 3,131,536 | A | * | 5/1964 | Snell |
| 3,666,209 | A | * | 5/1972 | Taylor |
| D311,719 | S | * | 10/1990 | Haga |
| 8,667,775 | B1 | * | 3/2014 | Kisska et al. |
| 9,488,103 | B2 | * | 11/2016 | Suciu et al. |

FOREIGN PATENT DOCUMENTS

WO   2011002517 A2   1/2011

* cited by examiner

*Primary Examiner* — Justin M Benedik
(74) *Attorney, Agent, or Firm* — Cantor Colburn LLP

(57) ABSTRACT

A vertical take-off and landing (VTOL) aircraft is provided and includes a fuselage, wings extending outwardly from opposite sides of the fuselage, nacelles supportively disposed on the wings and reversely oriented, axial flow engines disposed in each of the nacelles to generate mechanical energy for driving lift and thrust generating prop-rotor rotations.

15 Claims, 4 Drawing Sheets

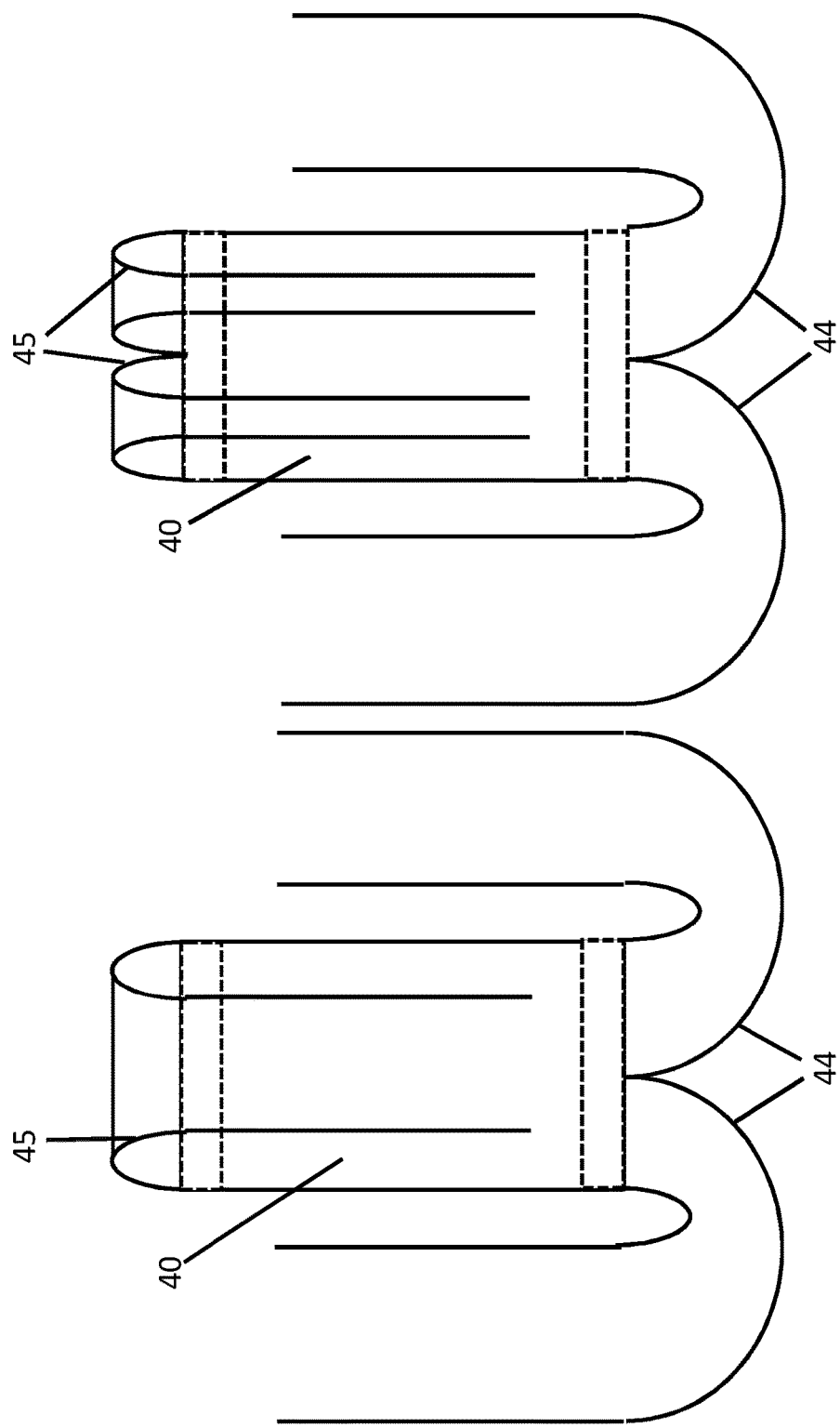

ENGINE INSTALLATION OF VERTICAL TAKE-OFF AND LANDING (VTOL) AIRCRAFT

CROSS-REFERENCE TO RELATED APPLICATIONS

This application claims benefit of priority of U.S. Provisional Application No. 62/149,948 filed on Apr. 20, 2015, the disclosure of which is incorporated by reference.

BACKGROUND OF THE INVENTION

The subject matter disclosed herein relates to an engine installation and, more particularly, to an engine installation of a vertical take-off and landing (VTOL) aircraft.

Aircraft missions often require VTOL capability that is combined with long range and endurance and can be very demanding. Conventional configurations of such aircraft are designed primarily for efficient forward flight, for efficient vertical lift or a poor compromise solution that permits both forward and vertical flight. Alternatively, some configurations include tilt-wing or tilt-rotor features that allow tilting of the fuselage with respect to the nacelles and have VTOL capabilities, long range and endurance but pay a high penalty in terms of complexity, higher empty weight and other inefficiencies.

One particular configuration is a rotor blown wing (RBW) configuration where a hybrid aircraft can fly as a rotorcraft and as a fixed wing aircraft. This configuration places stringent requirements on the engine, however, and necessitates control of engine exhaust since engine exhaust can have adverse impacts if it is placed close to the trailing edge of the vehicle and the ground. Thus, RBW aircraft can use reverse or axial flow engines. Reverse flow engines offer good exhaust placement but limited selection and axial flow engines increase engine options but have less than desirable exhaust locations.

BRIEF DESCRIPTION OF THE INVENTION

According to one aspect of the invention, a vertical take-off and landing (VTOL) aircraft is provided and includes a fuselage, wings extending outwardly from opposite sides of the fuselage, nacelles supportively disposed on the wings and reversely oriented, axial flow engines disposed in each of the nacelles to generate mechanical energy for driving lift and thrust generating prop-rotor rotations.

In accordance with additional or alternative embodiments, each engine includes an inlet disposed proximate to a trailing edge of the corresponding one of the wings and an outlet disposed proximate to a leading edge of the corresponding one of the wings.

In accordance with additional or alternative embodiments, one or more inlet ducts are disposed to direct inlet air flowing along the corresponding one of the wings in a rearward direction toward the inlet and one or more outlet ducts are disposed to direct engine exhaust from the outlet along the corresponding one of the wings in the rearward direction.

In accordance with additional or alternative embodiments, the one or more outlet ducts are axially misaligned with respect to the one or more inlet ducts.

In accordance with additional or alternative embodiments, the one or more inlet and outlet ducts are provided in one of 1:1, 1:2, 2:1 and 2:2 ratios.

In accordance with additional or alternative embodiments, respective orientations of the one or more inlet and outlet ducts are adjustable.

In accordance with additional or alternative embodiments, one inlet duct is disposed to direct inlet air flowing along the corresponding one of the wings in a rearward direction toward the inlet and two outlet ducts are disposed to direct engine exhaust from the outlet along the corresponding one of the wings in the rearward direction.

In accordance with additional or alternative embodiments, the one inlet duct is disposed in span-wise alignment with the corresponding one of the engines and the two outlet ducts are disposed aside the corresponding one of the engines.

In accordance with additional or alternative embodiments, the aircraft further includes an Infrared (IR) suppression system.

According to yet another aspect of the invention, a vertical take-off and landing (VTOL) aircraft is provided and includes a fuselage, wings extending outwardly from opposite sides of the fuselage, nacelles supportively disposed on the wings, reversely oriented, axial flow engines disposed in each of the nacelles to generate mechanical energy from a combustion of compressed inlet air and fuel and prop-rotors, which are driven to rotate by the mechanical energy generated by the engines, to thereby generate aircraft lift and thrust.

In accordance with additional or alternative embodiments, each engine includes an inlet disposed proximate to a trailing edge of the corresponding one of the wings and an outlet disposed proximate to a leading edge of the corresponding one of the wings.

In accordance with additional or alternative embodiments, one or more inlet ducts are disposed to direct inlet air flowing along the corresponding one of the wings in a rearward direction toward the inlet and one or more outlet ducts are disposed to direct engine exhaust from the outlet along the corresponding one of the wings in the rearward direction.

In accordance with additional or alternative embodiments, the one or more outlet ducts are axially misaligned with respect to the one or more inlet ducts.

In accordance with additional or alternative embodiments, the one or more inlet and outlet ducts are provided in one of 1:1, 1:2, 2:1 and 2:2 ratios.

In accordance with additional or alternative embodiments, respective orientations of the one or more inlet and outlet ducts are adjustable.

In accordance with additional or alternative embodiments, the aircraft further includes an Infrared (IR) suppression system.

In accordance with additional or alternative embodiments, one inlet duct is disposed in span-wise alignment with the corresponding one of the engines to direct inlet air flowing along the corresponding one of the wings in a rearward direction toward the inlet and two outlet ducts are disposed aside the corresponding one of the engines to direct engine exhaust from the outlet along the corresponding one of the wings in the rearward direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a schematic diagram of an engine inlet and outlet configuration in accordance with embodiments; and FIG. 6 is a schematic diagram of an engine inlet and outlet configuration in accordance with embodiments.

The detailed description explains embodiments of the invention, together with advantages and features, by way of example with reference to the drawings.

DETAILED DESCRIPTION OF THE INVENTION

As will be described below, a vertical take-off and landing (VTOL) hybrid aircraft is provided with a rotor blown wing (RBW) configuration and axial flow engines installed reversely. The aircraft is driven from the rear during take-off with engine inlets oriented rearward and exhaust ports oriented forwardly.

Figure 1:
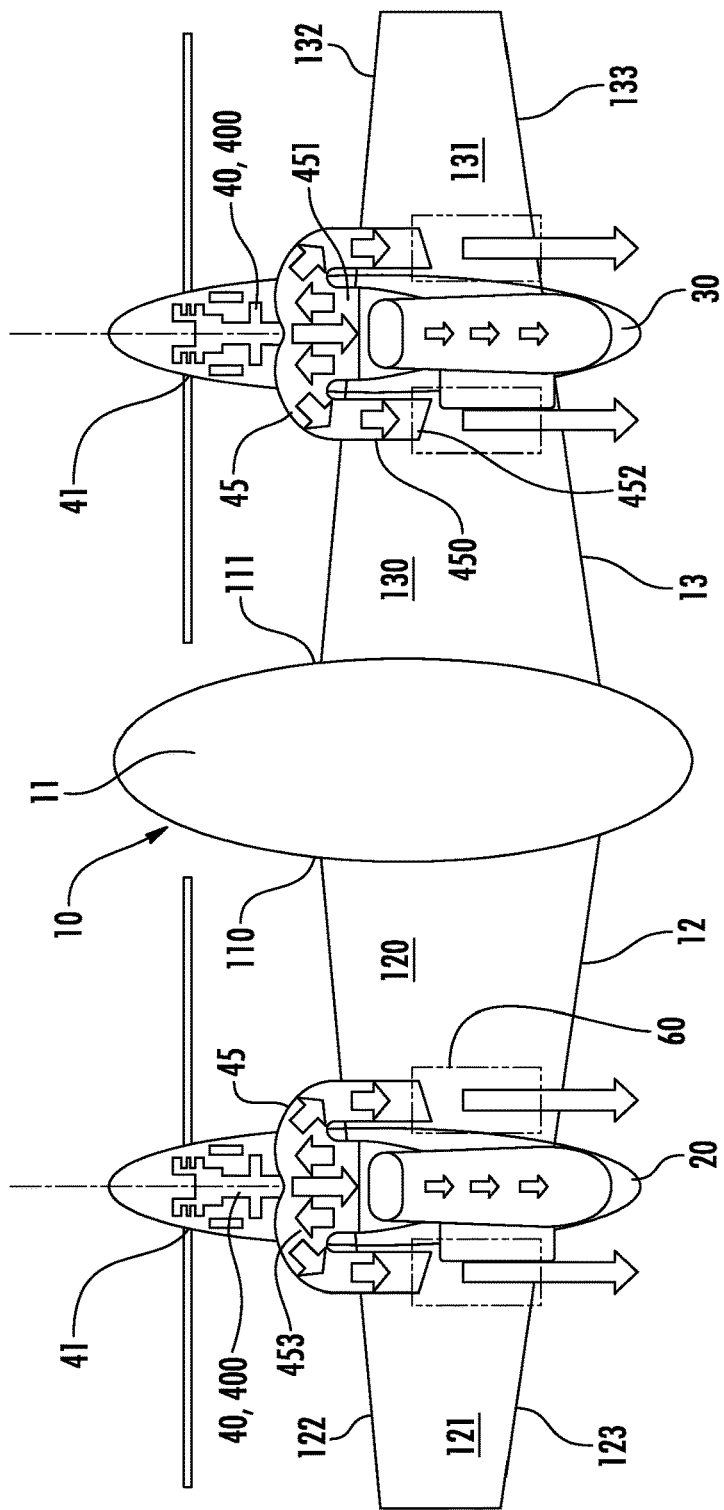
FIG. 1 is a top-down view of an RBW aircraft in accordance with embodiments.
Figure 2:
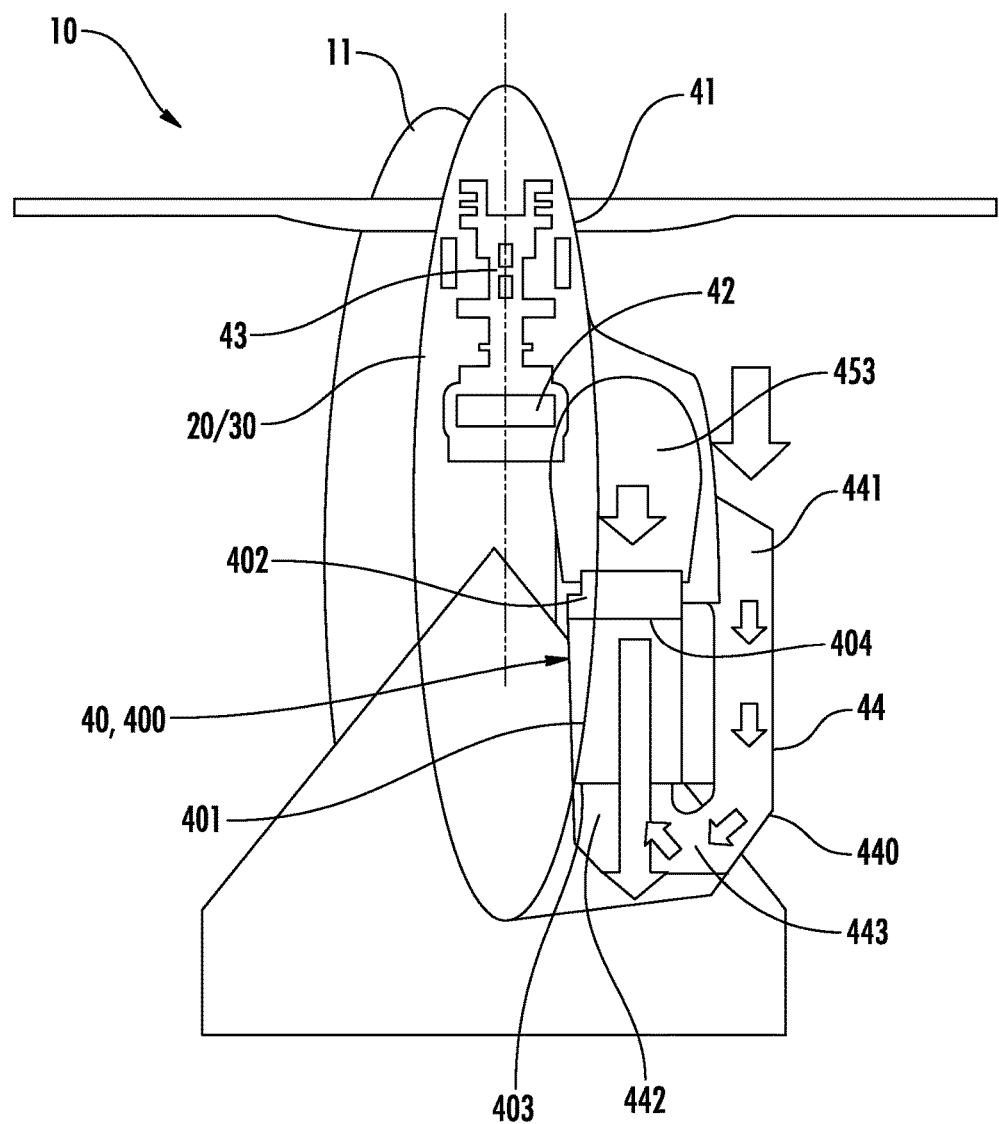
FIG. 2 is a side view of the RBW aircraft of FIG. 1.
Figure 4:
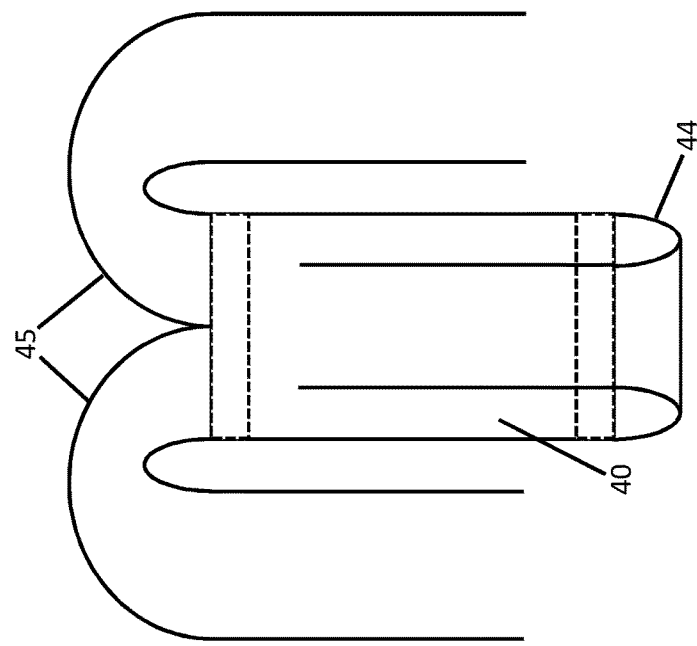
FIG. 4 is a schematic diagram of an engine inlet and outlet configuration in accordance with embodiments.

With reference to FIGS. 1 and 2, a rotor blown wing (RBW) vertical take-off and landing (VTOL) aircraft 10 is provided and may be referred to as a "tail sitter aircraft." The aircraft 10 includes a fuselage 11 that generally has an aerodynamic shape with a nose section and a trailing end opposite from the nose section. The fuselage 11 is generally smooth but may include sensor components, a dorsal fin and/or horizontal or vertical stabilizer elements. The fuselage 11 has first and second opposite sides 110 and 111 and may be formed and sized to encompass at least one or more of aircraft electronic components, payload elements and fuel in accordance with mission requirements.

The aircraft 10 further includes first and second wings 12 and 13 that extend outwardly from the first and second opposite sides 110 and 111 of the fuselage 11, respectively, a first nacelle 20 supported on the first wing 12, a second nacelle 30 supported on the second wing 13 and a flight computer.

Each of the first and second wings 12 and 13 may include a main wing 120, 130 and a winglet 121, 131. At the first wing 12, the main wing 120 extends outwardly from the first side 110 of the fuselage 11 and has a distal end to which the first nacelle 20 is coupled. The winglet 121 may be fixedly or pivotably coupled to an opposite side of the first nacelle 20. At the second wing 13, the main wing 130 extends outwardly from the second side 111 of the fuselage 11 and has a distal end to which the second nacelle 30 is coupled. The winglet 131 may be fixedly or pivotably coupled to an opposite side of the second nacelle 30.

In accordance with embodiments, the first and second wings 12 and 13 may be configured as high aspect ratio wings that have a span or longitudinal length that substantially exceeds a chord where the span or longitudinal length is measured from the first and second opposite sides 110 and 111 to distal tips of the first and second wings 12 and 13 and the chord is measured from the leading edges 122, 132 of the first and second wings 12 and 13 to the trailing edges 123, 133 of the first and second wings 12 and 13. In accordance with further embodiments, either or both of the leading edges 122, 132 and the trailing edges 123, 133 may be forwardly or rearwardly swept.

The first and second nacelles 20 and 30 are supportively disposed on each of the first and second wings 12 and 13 at about 40-60% span locations, respectively. The first and second nacelles 20 and 30 have an aerodynamic shape with forward sections, trailing end portions opposite from the forward sections and nacelle frames. The nacelle frame is generally smooth and formed and sized to encompass an engine 40 and/or fuel/storage tanks formed and sized to encompass fuel, aircraft electronic components and/or payload elements.

Although not shown, the aircraft 10 may further include alighting elements coupled to the trailing end portions of each of the first and second nacelles 20 and 30. These alighting elements may form at least a three-point or four-point stable support system that supports the aircraft 10 against rolling over in any given direction. Each of the alighting elements may include a support and an alighting support element at a distal end of the support such that the alighting support element can be positioned away from a plane of the first and second wings 12 and 13 and engine exhaust.

As shown in FIGS. 1 and 2, each of the first and second nacelles 20 and 30 is disposed to support the engine 40 therein. The engines 40 are each receptive of inlet air, which is compressed and mixed with fuel to form an air-fuel mixture that is combusted within a combustor 401 to produce high temperature and high pressure fluids. These fluids are then directed from the combustor 401 to a turbine 402 in which the fluids are expanded to generate mechanical power that is used to drive rotations of prop-rotors 41 to thereby generate lift and thrust for the aircraft 10. The prop-rotors 41 are each disposed at the forward sections of the first and second nacelles 20 and 30 and forward of the leading edges 122, 132 of the first and second wings 12 and 13. The mechanical power generated within the turbines 402 is transferred to the prop-rotors 41 by way of transmission systems including a main gearbox 42 and a driveshaft 43.

In accordance with embodiments, mechanical power may be transferred from the exhaust side of the engine 40. As an additional or alternative embodiment, mechanical power may also be transferred from the inlet side of the engine 40 via an engine input gear and drive shaft to a main gearbox.

Each of the engines 40 may be provided as an axial flow engine 400 that is installed in a reverse configuration or orientation. That is, the axial flow engine 400 is installed such that inlet airflow is received by an inlet 403 of the engine 40 at a rearward location proximate to a trailing edge 123, 133 of the corresponding one of the first and second wings 12 and 13 and engine exhaust is output from an outlet 404 of the engine 40 at a forward location proximate to a leading edge 122, 132 of the corresponding one of the first and second wings 12 and 13.

As shown in FIGS. 1 and 2 and with additional reference to FIGS. 3-6, each of the engines 40 may also include one or more inlet ducts 44 and one or more outlet ducts 45. In general, the one or more inlet ducts 44 and the one or more outlet ducts 45 are axially misaligned with one another. Thus, engine exhaust flowing out of the one or more outlet ducts 45 will not flow into any of the one or more inlet ducts 44.

The inlet ducts 44 are disposed to direct inlet air flowing along the corresponding one of the first and second wings 12 and 13 in a rearward direction toward the inlet 403 of the corresponding one of the engines 40. The inlet ducts 44 thus include sidewalls 440 that are formed to define a first air flow pathway that extends from an inlet portion 441 to an outlet portion 442 via a curved portion 443. The outlet portion 442 is adjacent to and terminates at the inlet 403 of the corresponding engine 40 and the inlet portion 441 is elongated and terminates at a chord location defined forward from the inlet 403. The curved portion 443 may be formed as a single hairpin (or 180°) curve or may include multiple curves.

The outlet ducts 45 are disposed to direct engine exhaust from the outlet 404 along the corresponding one of the first and second wings 12 and 13 in a rearward direction. The outlet ducts 45 thus include sidewalls 450 that are formed to define a second air flow pathway that extends from an inlet portion 451 to an outlet portion 452 via a curved portion 453. The inlet portion 451 is adjacent to and begins at the outlet 404 of the corresponding engine 40 and the outlet portion 452 is elongated and terminates at a chord location defined rearward from the outlet 404 and the inlet portion 441 of any proximal inlet ducts 44. The curved portion 453 may be formed as a single hairpin (or 180°) curve or may include multiple curves.

As shown in FIG. 1, the outlet portion 452 of each outlet duct 45 may have a taper that leads toward the leading edge 122, 132 of the corresponding one of the first and second wings 12 and 13 with increasing distance away from the engine 40. Also, the curved portion 443 of each inlet duct 44 may have a blunt curvature that is forward of a trailing end section of the corresponding one of the first and second nacelles 20 and 30. As shown in FIG. 2, the inlet portion 441 of each inlet duct 44 may have a taper that leads toward the trailing edge 123, 133 of the corresponding one of the first and second wings 12 and 13 with increasing distance away from the engine 40. Also, the curved portion 453 of each outlet duct 45 may be shaped to reduced internal flow turn losses.

As shown in FIGS. 3-6, the one or more inlet and outlet ducts 44, 45 may be provided and shaped to reduce internal duct losses and also to reduce external drag. The one or more inlet and outlet ducts 44, 45 may be shaped to divert flow in two directions (i.e., left and/or right or top and/or bottom). That is, each engine 40 may include a single inlet duct 44 and a single outlet duct 45 with the inlet portion 441 of the single inlet duct 44 and the outlet portion 452 of the single outlet duct 45 disposed on opposite sides of the corresponding engine 40 (see FIG. 3). Alternatively, each engine 40 may include a single inlet duct 44 with the inlet portion 441 thereof aligned in the span-wise dimension with the corresponding engine 40 and two outlet ducts 45 whose respective outlet portions 452 are disposed on opposite sides of the corresponding engine 40 (see FIG. 4). As another example, each engine 40 may include two inlet ducts 44 whose respective inlet portions 441 are disposed on opposite sides of the corresponding engine 40 and a single outlet duct 45 with the outlet portion 452 thereof aligned in the span-wise dimension with the corresponding engine 40 (see FIG. 5). As yet another example, each engine 40 may include two inlet ducts 44 whose respective inlet portions 441 are disposed on opposite sides of the corresponding engine 40 and two outlet ducts 45 whose respective outlet portions 452 are aligned in the span-wise dimension with the corresponding engine 40 (see FIG. 6).

Figure 3:
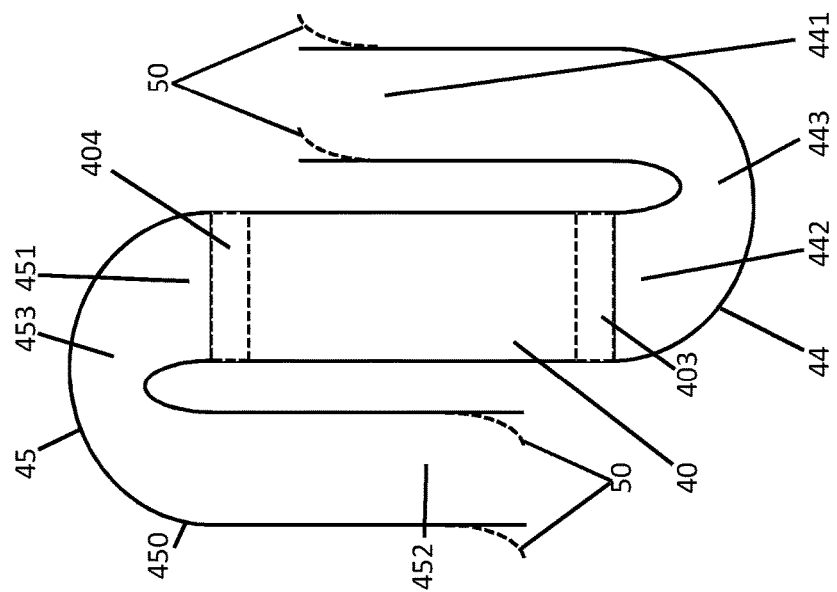
FIG. 3 is a schematic diagram of an engine inlet and outlet configuration in accordance with embodiments.

In each case noted above and in other cases, the one or more inlet and outlet ducts 44 and 45 need not have the same dimensions or sizes. That is, the inlet and outlet ducts 44 and 45 can be substantially similar in size, as shown in FIG. 3, whereas the inlet ducts 44 can be larger than the outlet ducts 45, as shown in FIG. 6, or vice versa. In addition, it is to be understood that the various configurations of FIGS. 3-6 are exemplary and can be modified or switched around as needed.

In accordance with further embodiments and, with reference to FIG. 3, respective orientations of the one or more inlet and outlet ducts 44 and 45 are adjustable. Such adjustments may be controlled by the flight computer of the aircraft 10 in accordance with current conditions and/or pilot inputted commands. The adjustments are effectuated by adjustable end sections 50 of the one or more inlet and outlet ducts 44 and 45. These adjustable end sections 50 may be disposed at terminals of the one or more inlet and outlet ducts 44 and 45 and may be provided as smart or memory materials or as servo controlled baffles. In any case, respective orientations of the adjustable end sections 50 can be modified to change an angle of inflowing inlet air or to change an angle of outflowing engine exhaust.

In accordance with still further embodiments and, as shown in FIG. 1, the aircraft 10 may include an engine exhaust Infrared (IR) radiation suppression system 60. Such a system 60 could be seated at or proximate to the outlet portions 452 of the outlet ducts 45 and thus would not add to an overall length of the aircraft 10. The system 60 would then aerodynamically interact with the fluids exiting the outlet portions 452 to reduce or otherwise limit an IR signature of the aircraft 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vertical take-off and landing (VTOL) rotor blown wing (RBW) aircraft, comprising:
a fuselage;
RBWs extending outwardly from opposite sides of the fuselage;
nacelles supportively disposed on the RBWs; and
reversely oriented, axial flow engines disposed in each of the nacelles to generate mechanical energy for driving lift and thrust generating prop-rotor rotations, wherein each of the reversely oriented, axial flow engines includes:
an inlet disposed proximate to a trailing edge of the corresponding one of the wings;
one or more inlet ducts disposed to direct inlet air flowing along the corresponding one of the wings in a rearward direction toward the inlet,
an outlet disposed proximate to a leading edge of the corresponding one of the wings, and
one or more outlet ducts disposed to direct engine exhaust from the outlet along the corresponding one of the wings in the rearward direction, the orientation of the one of more outlet ducts being adjustable.

2. The VTOL aircraft according to claim 1, wherein the one or more outlet ducts are axially misaligned with respect to the one or more inlet ducts.

3. The VTOL aircraft according to claim 1, wherein the one or more inlet and outlet ducts are provided in multiple configurations.

4. The VTOL aircraft according to claim 1, wherein orientations of the one or more inlet ducts is adjustable.

5. The VTOL aircraft according to claim 1, further comprising:
wherein the one or more inlet ducts comprise one inlet duct disposed to direct inlet air flowing along the corresponding one of the wings in a rearward direction toward the inlet; and
wherein the one or more outlet ducts comprise two outlet ducts disposed to direct engine exhaust from the outlet along the corresponding one of the wings in the rearward direction.

6. The VTOL aircraft according to claim 5, wherein the one inlet duct is disposed in span-wise alignment with the corresponding one of the engines and the two outlet ducts are disposed aside the corresponding one of the engines.

7. The VTOL aircraft according to claim 1, further comprising an Infrared (IR) suppression system.

8. A vertical take-off and landing (VTOL) rotor blown wing (RBW) aircraft, comprising:
a fuselage;
RBWs extending outwardly from opposite sides of the fuselage;
nacelles supportively disposed on the RBWs;
reversely oriented, axial flow engines disposed in each of the nacelles to generate mechanical energy from a combustion of compressed inlet air and fuel; and
prop-rotors, which are driven to rotate by the mechanical energy generated by the engines, to thereby generate aircraft lift and thrust, wherein each of the reversely oriented, axial flow engines includes:
an inlet disposed proximate to a trailing edge of the corresponding one of the wings;
one or more inlet ducts disposed to direct inlet air flowing along the corresponding one of the wings in a rearward direction toward the inlet,
an outlet disposed proximate to a leading edge of the corresponding one of the wings, and
one or more outlet ducts disposed to direct engine exhaust from the outlet along the corresponding one of the wings in the rearward direction, the orientation of the one of more outlet ducts being adjustable.

9. The VTOL aircraft according to claim 8, wherein the one or more outlet ducts are axially misaligned with respect to the one or more inlet ducts.

10. The VTOL aircraft according to claim 8, wherein the one or more inlet and outlet ducts are provided in one of multiple configurations.

11. The VTOL aircraft according to claim 8, wherein the orientation of the one or more inlet ducts is adjustable.

12. The VTOL aircraft according to claim 8, further comprising:
wherein the one or more inlet ducts comprise one inlet duct disposed in span-wise alignment with the corresponding one of the engines to direct inlet air flowing along the corresponding one of the wings in a rearward direction toward the inlet; and
wherein the one or more outlet ducts comprise two outlet ducts disposed aside the corresponding one of the engines to direct engine exhaust from the outlet along the corresponding one of the wings in the rearward direction.

13. The VTOL aircraft according to claim 8, further comprising an Infrared (IR) suppression system.

14. The VTOL aircraft according to claim 1, wherein the VTOL aircraft is a tail sitter.

15. The VTOL aircraft according to claim 8, wherein the VTOL aircraft is a tail sitter.

* * * * *